Jan. 12, 1932.  H. S. JANDUS  1,840,722
BUMPER
Filed Feb. 14, 1930   2 Sheets-Sheet 1
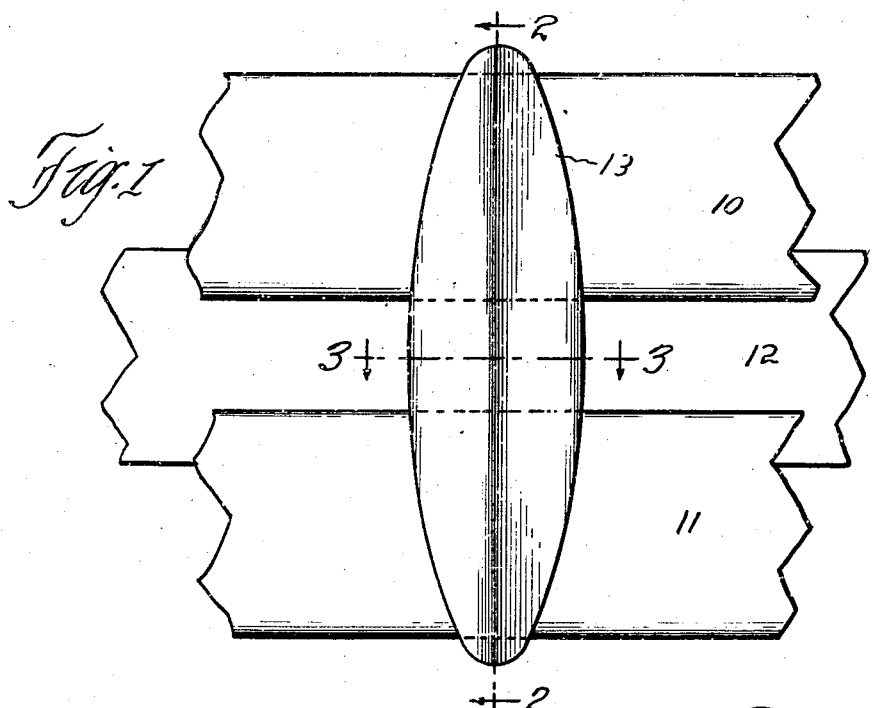
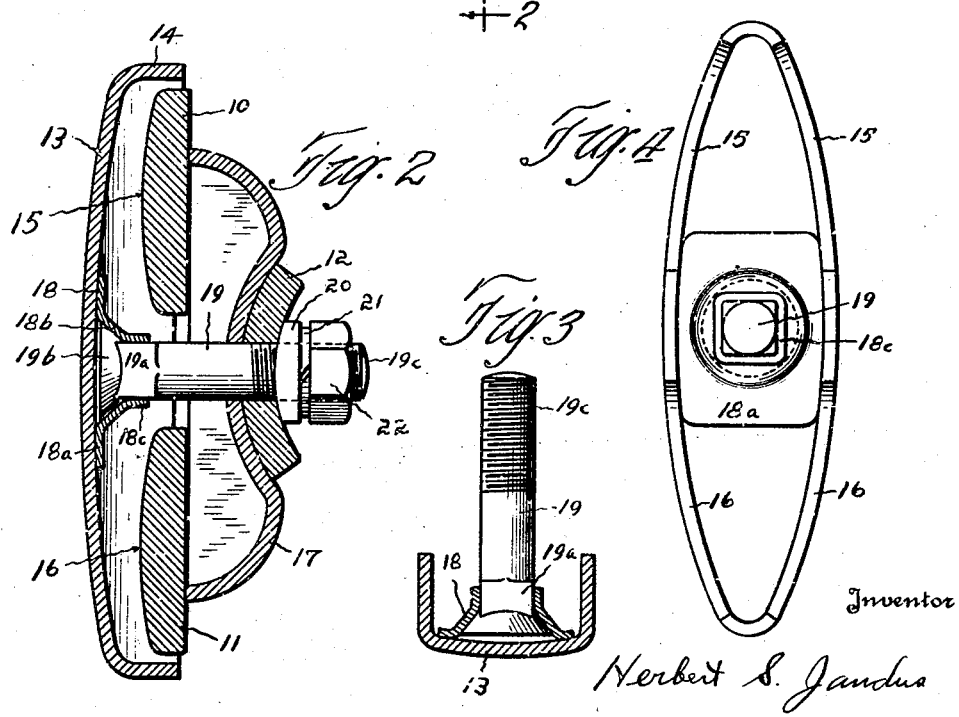
Inventor
Herbert S. Jandus
By Hull Brock + West
Attorney Jan. 12, 1932.　　　　H. S. JANDUS　　　　1,840,722
BUMPER
Filed Feb. 14, 1930　　　2 Sheets-Sheet 2

INVENTOR.
Herbert S. Jandus
BY Hull Brock + West
ATTORNEY.

Patented Jan. 12, 1932

1,840,722

UNITED STATES PATENT OFFICE

HERBERT S. JANDUS, OF DETROIT, MICHIGAN

BUMPER

Application filed February 14, 1930. Serial No. 428,279.

This invention relates to a bumper construction and has for its principal object to provide in such a construction a clamp plate having a clamping bolt attached thereto in such a manner that a continuous finished outer surface may be provided without the necessity of providing a separate sheet of metal to be finished, thereby securing a simple and durable construction without introducing avoidable complexities of structure.

Figure 5:
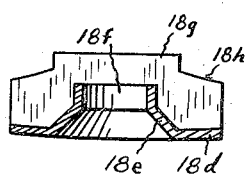
Figure 6:
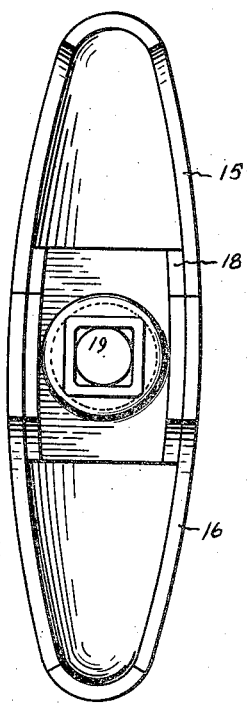
Figure 8:
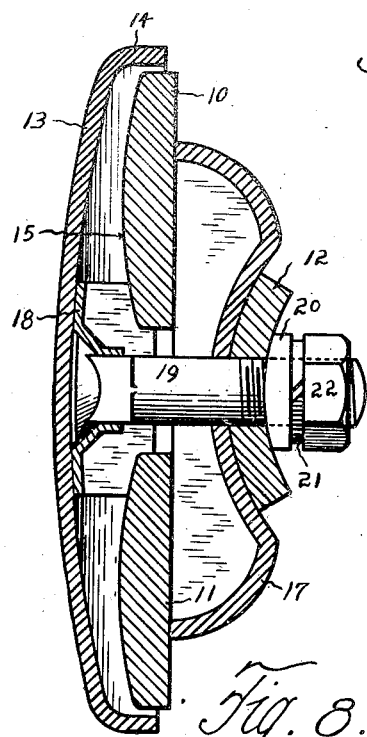
Figure 7:
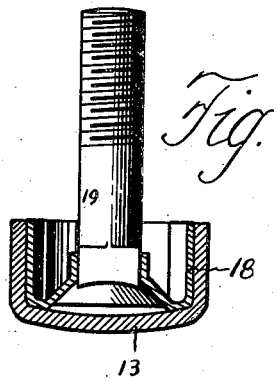

Referring to the accompanying drawings, Fig. 1 is a fragmentary front elevational view of a bumper construction showing my improved clamp plate in position; Fig. 2 is a sectional view corresponding to the line 2—2 of Fig. 1; Fig. 3 is a section on the line 3—3 of Fig. 1; Fig. 4 is a rear elevation of the bumper clamp showing the same removed from the other parts of the bumper construction; Fig. 5 is a detail of a modified form of the member 18; Fig. 6 is a view corresponding to Fig. 4 and showing the modified form in position; Fig. 7 is a section taken centrally of Fig. 6; and Fig. 8 is a view of the modified form corresponding to Fig. 2.

In Fig. 1 I have shown the bumper construction comprising impact bars 10 and 11, rear bar 12 and clamp plate 13. As best seen in Fig. 2, the clamp plate 13 comprises a front portion and a peripheral flange 14 extending substantially at right angles to the front portion and having notches 15 and 16 adapted to receive the impact bars 10 and 11. A spacing plate 17 is provided for holding the impact bars 10 and 11 in proper position with respect to the rear bar 12. Attached to the front plate by welding or other suitable means, not including any means which involves piercing the front plate, is a collar designated generally by the numeral 18 having a flange $18^a$ adapted to fit snugly against the front plate, a frusto-conical portion $18^b$ into which said flange merges and a flange portion $18^c$ merging into said frusto-conical portion and being of polygonal across section to conform to the shoulder $19^a$ of the plow bolt 19. The plow bolt 19 as shown is provided with a frusto-conical head portion $19^b$, a shoulder $19^a$ and a threaded shank portion $19^c$. A washer 20 and a lock washer 21 cooperates with said bolt and a nut 22 to hold all the parts of the assembly in fixed position with respect to each other.

In Figs. 5 to 8 inclusive I have shown a slightly modified form of my invention which differs from the modification in Figs. 1 to 4 by the construction of the bolt holding collar member shown in detail in Fig. 5. As shown, this construction differs from that of the other modification in the provision of an upwardly extending portion $18^g$ which is integral with the flange $18^d$, corresponding to $18^a$ in the other modification, and extends upwardly along the flange 14 of the clamp plate member 13. As is clearly seen in Figs. 5 and 6, the upwardly extending portion $18^g$ is notched at the corners as shown at $18^h$ to correspond with the ends of the notches 15 and 16. In this way the bumper bars 10 and 11 engage the portion $18^g$ in the notches $18^h$ and thereby take the stress off the weld between the collar and the plate 13. This flange $18^h$ preferably extends very slightly beyond the edges of the notches 15 and 16 whereby substantially all the tension is carried by the collar instead of the weld joint between the same and the clamp plate.

From the foregoing it will be seen that I have provided a bumper construction in which a single plate may, when constructed of proper material, serve the mechanical function of clamp plate and be adaptable for receiving a high polish to present a smooth and uninterrupted polished surface without the use of a veneering sheet of metal.

Having thus described my invention, what I claim is:

1. In a bumper construction, a pair of spaced impact bars, a secondary bar spaced rearwardly from said impact bars, and means for holding said bars in position with respect to each other, said means including a clamp plate having a peripheral flange, notches in said flange to receive said impact bars, a spacing plate between said impact bars and said rear bar and means for holding said plates and bars in fixed relation including a collar attached to the rear surface of said clamp plate, a bolt passing through a portion of said collar and held thereby in fixed relation to said clamp plate, said bolt passing through said spacing plate and said rear bar and a nut cooperating with said bolt to maintain the parts of said construction in fixed relation to each other.

2. A bumper construction including a clamp plate, a headed bolt, and a collar attached to the surface of said plate and holding said bolt in substantially fixed relation to said plate, all parts of said bolt being on the same side of said plate.

3. In a bumper construction, a pair of spaced impact bars, a supporting bar spaced rearwardly from said impact bars, and means for holding said bars in position with respect to each other, said means including a clamp plate having a peripheral flange, notches in said flange to receive said impact bars, a spacing plate between said impact bars and said rear bar and means for holding said plates and bars in fixed relation including a collar attached to the rear surface of said clamp plate, a bolt passing through a portion of said collar and held thereby in fixed relation to said clamp plate, said bolt passing through said spacing plate and said rear bar and a nut cooperating with said bolt to maintain the parts of said construction in fixed relation to each other, said collar including a flange fitting against said plate and a frusto-conical portion.

4. A bumper construction including a clamp plate, a headed bolt, and a collar attached to the surface of said plate and holding said bolt in substantially fixed relation to said plate, all parts of said bolt being on the same side of said plate, said collar including a flange fitting against said plate and a frusto-conical portion.

5. A bumper construction including a clamp plate, a headed bolt, and a collar attached to the surface of said plate and holding said bolt in substantially fixed relation to said plate, all parts of said bolt being on the same side of said plate, said collar including a flange fitting against said plate and a frusto-conical portion, and said collar further including a flange of polygonal shape.

6. In a bumper construction, a pair of spaced impact bars, a supporting bar spaced rearwardly from said impact bars, and means for holding said bars in position with respect to each other, said means including a clamp plate having a peripheral flange, notches in said flange to receive said impact bars, a spacing plate between said impact bars and said rear bar and means for holding said plates and bars in fixed relation including a collar attached to the rear surface of said clamp plate, a bolt passing through a portion of said collar and held thereby in fixed relation to said clamp plate, said bolt passing through said spacing plate and said rear bar and a nut cooperating with said bolt to maintain the parts of said construction in fixed relation to each other, said collar including a flange fitting against said plate and a frusto-conical portion, said plate having a flange thereon, and notches in said flange, said collar also having a portion integral therewith and extending along said flange as far as the edge of said notches.

7. A bumper construction including a clamp plate, a headed bolt, and a collar attached to the surface of said plate and holding said bolt in substantially fixed relation to said plate, all parts of said bolt being on the same side of said plate, said collar including a flange fitting against said plate and a frusto-conical portion, said plate having a flange thereon, and notches in said flange, said collar also having a portion integral therewith and extending along said flange as far as the edge of said notches.

8. A bumper construction including a clamp plate, a headed bolt, and a collar attached to the surface of said plate and holding said bolt in substantially fixed relation to said plate, all parts of said bolt being on the same side of said plate, said collar including a flange fitting against said plate and a frusto-conical portion, said plate having a flange thereon, and notches in said flange, said collar also having a portion integral therewith and extending along said flange slightly beyond the edge of said notches.

9. Bumper construction comprising a clamp plate having an uninterrupted front face, a separate bolt, and means permanently securing said bolt to the rear face of said plate.

10. Bumper construction comprising a clamp plate having an uninterrupted front face and a socket on one face and a bolt having its head permanently secured in said socket.

11. Bumper construction including a clamp plate having a continuous front face, a bolt having a laterally projecting portion at one end adjacent the rear face of the plate, said rear face having means permanently interlocked with said portion of the bolt.

12. A bumper clamp construction comprising a clamp plate, a separate headed bolt, and means carried by said plate and permanently embracing the bolt head, said means and bolt being disposed entirely on one side of said plate.

13. A clamp construction comprising a plate, a separate headed bolt, and means integral with said plate and engaging that surface of said head which faces away from said plate, to thereby couple the bolt to the plate.

14. A clamp construction comprising a substantially imperforate clamp plate, a bolt, and means permanently coupling said bolt to said plate, said means engaging said plate at points remote from the axis of the bolt, to avoid localization of stresses from the bolt.

15. A clamp construction comprising a clamp plate, a bolt, and means permanently coupling said bolt to said plate, said means engaging said plate at points remote from the axis of the bolt, to avoid localization of stresses from the bolt, said bolt being disposed entirely on one side of said plate.

16. Bumper construction comprising a clamp plate having a socket on one face, said plate substantially closing one end of the socket, and a bolt having its head permanently secured in said socket, said socket engaging said plate at points remote from the axis of the bolt, to thereby avoid localization of stresses from the bolt.

In testimony whereof, I hereunto affix my signature.

HERBERT S. JANDUS.